United States Patent [19]

Cattin et al.

[11] Patent Number: 4,645,296
[45] Date of Patent: Feb. 24, 1987

[54] OPTICAL FIBER CONNECTOR APPARATUS AND METHOD OF MANUFACTURE

[75] Inventors: Bernard W. Cattin, Lancaster; Dimitry Grabbe, Middletown, both of Pa.

[73] Assignee: AMP Incorporated, Harrisburg, Pa.

[21] Appl. No.: 683,986

[22] Filed: Dec. 20, 1984

[51] Int. Cl.[4] .............................................. G02B 6/38
[52] U.S. Cl. ................................................ 350/96.21
[58] Field of Search ............... 350/96.20, 96.21, 96.22

[56] References Cited

U.S. PATENT DOCUMENTS

| | | | |
|---|---|---|---|
| 3,803,409 | 4/1974 | Prochazka | 350/96.21 X |
| 4,088,386 | 5/1978 | Hawk | 350/96.21 |
| 4,101,198 | 7/1978 | Heldt | 350/96.21 |
| 4,164,363 | 8/1979 | Hsu | 350/96.17 |
| 4,179,186 | 12/1979 | Tynes | 350/96.21 |
| 4,193,665 | 3/1980 | Arnold | 350/96.22 |
| 4,201,445 | 5/1980 | Kunze | 350/96.21 |
| 4,205,898 | 6/1980 | Matthews | 350/96.21 |
| 4,273,412 | 6/1981 | Hillegonds | 350/96.20 |
| 4,477,146 | 10/1984 | Bowen et al. | 350/96.2 X |

OTHER PUBLICATIONS

IBM Technical Disclosure Bulletin, vol. 26, No. 3B, Aug. 1983, "Fiber Optic Connector" E. C. Uberbacher, p. 1648.

*Primary Examiner*—William L. Sikes
*Assistant Examiner*—L. Rushin

[57] ABSTRACT

Apparatus for accurately and automatically aligning a pair of optical fibers in abutting end-to-end relationship. The apparatus includes an optical fiber holder having an opening in substantially the exact center of one end thereof for supporting the end of an optical fiber therein. The holder comprises a one-piece, cylindrical-shaped housing having integral centering elements around the periphery thereof. The centering elements cooperate with the wall of a bore in a connector member within which the holder is adapted to be inserted to automatically center the housing within the bore, and hence, to automatically align the end of the optical fiber with the bore axis.

When a second, similarly constructed holder supporting the end of a second optical fiber is also inserted into the bore of the connector member with their respective one ends in abutting end-to-end relationship, the ends of the two optical fibers will automatically be aligned with the bore axis and, hence, with each other. Preferably, the centering elements comprise a plurality of resilient housing segments positioned adjacent said one end of said housing and defined between the periphery of the housing and a plurality of non-diametrical slots extending across the end of the housing and axially into the housing. The invention further includes a method of manufacturing the housing to ensure that the opening in the end of the housing will be in substantially the exact center thereof.

14 Claims, 6 Drawing Figures

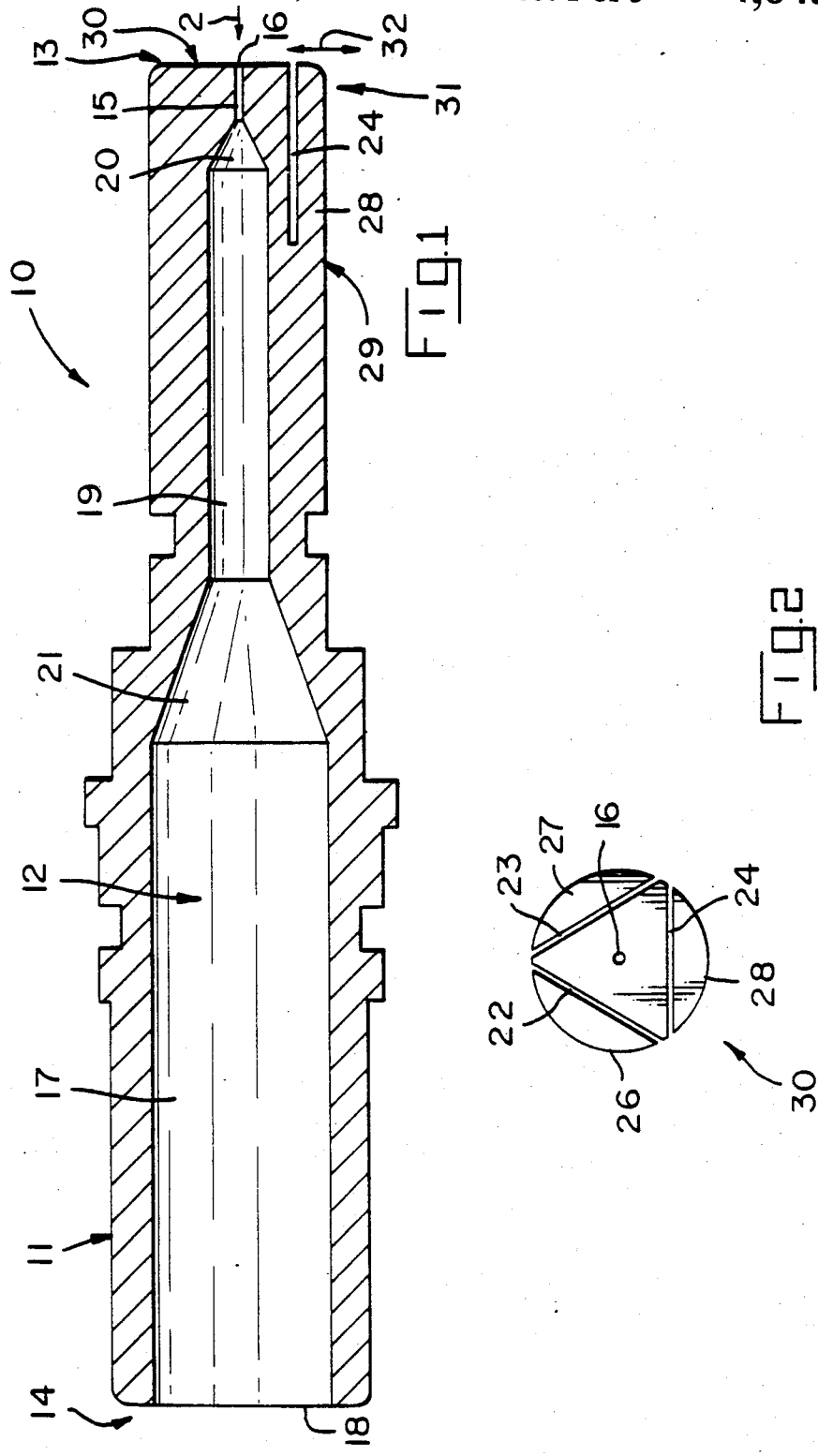

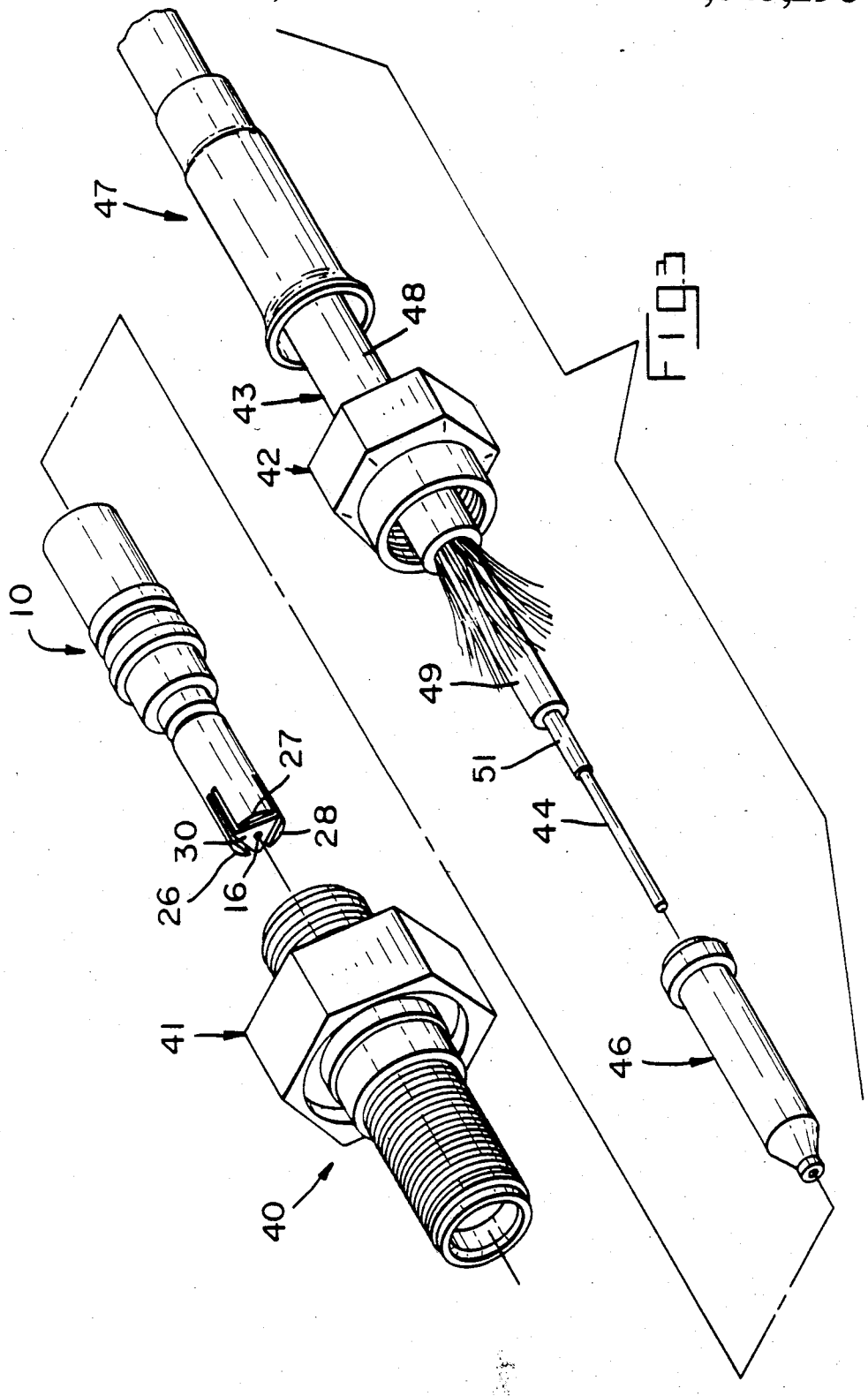

OPTICAL FIBER CONNECTOR APPARATUS AND METHOD OF MANUFACTURE

BACKGROUND OF THE INVENTION

The present invention relates to optical fiber connector apparatus, and, more particularly, to connector apparatus for accurately aligning a pair of optical fibers in abutting end-to-end relationship.

It is often necessary to connect the ends of two optical fibers to one another so that light can be transmitted from one fiber to the other. When connecting the two fibers, it is important that the loss of signal as a result of the transfer of the light from one fiber to the other be as low as possible, i.e., that there be a minimal insertion loss. When optical fibers are joined end-to-end, insertion loss can result from center-to-center mismatch, angular misalignment of the fiber axes, fiber to fiber separation, the finish of the ends of the fibers and other factors.

For optical fibers having a diameter of about 125 microns, misregistration of the centers of the two fibers by only 0.5 microns can result in a loss of as much as 1 db. For reasonably low insertion losses, therefore, the centers of the fiber end faces must be registered within at least about 12.5 microns, and preferably less.

A variety of apparatus for connecting a pair of optical fibers in end-to-end relationship with respect to one another are known in the art.

In one known type of connector, optical fibers are inserted into opposite ends of a cylindrical tube until they come into contact with one another. The fibers are then simply clamped or otherwise locked into position within the tube. In some connectors of this type, the tube is provided with a bore of V-shape or other configuration in order to achieve a more accurate alignment between the two fibers.

Connectors of this type are not fully satisfactory for several reasons. For one thing, any dirt within the cylinder bore can easily get between the two fibers and cause interference in the passage of light between the fibers or physically damage the ends of the fibers. The clamping step can also damage or distort the fragile fibers.

Frequently, the end of an optical fiber is terminated in a ferrule or termination member so that the fiber end can be more easily managed; and a number of connectors have also been developed to align ferrule-terminated fibers. For example, one type of connector comprises an elastomeric sleeve which expands radially inward to maintain the ferrule-terminated fibers in alignment. Such connectors, however, have been found to be less likely to provide an accurate and repeatable alignment than rigid connectors.

Connectors including longitudinally split spring members into which the ferrules are pushed for aligning the ferrules with one another are also known. These connectors usually require one or more additional components between the ferrules and the connector housing which increases both the cost and the complexity of the connector.

SUMMARY OF THE INVENTION

According to the present invention, an optical fiber connector apparatus is provided for accurately and efficiently aligning a pair of optical fibers in abutting end-to-end relationship. The apparatus includes an optical fiber holder or ferrule having a small opening formed in an end face thereof for receiving and supporting the end of an optical fiber.

The holder, according to a presently preferred embodiment, comprises a generally cylindrical-shaped housing having one or more centering elements positioned around the periphery thereof. The centering elements preferably comprise a plurality of resilient housing portions which are integral with the housing and which are adapted to cooperate with the wall of a bore in a connector member within which the holder is inserted to automatically center the housing within the bore.

Preferably, the small opening in the end face of the housing is positioned in substantially the exact center of the end face, such that the end of the optical fiber supported therein will also be positioned in substantially the exact center of the end face.

When the holder is inserted into the bore of a connector member, the centering elements cooperate with the wall of the bore to automatically center the end of the housing with respect to the longitudinal axis of the bore. Since the end of the optical fiber is supported in substantially the exact center of the end face, it will also be automatically aligned with the axis of the bore, and due to the action of the centering elements, such alignment will be precisely achieved notwithstanding any variations in the diameter of the housing or of the bore within the range of normal manufacturing tolerances.

A second optical fiber holder of substantially identical construction and supporting the end of a second optical fiber within a centrally positioned opening in an end face thereof is also inserted into the bore of the connector member with its end face abutting the end face of the first holder. The centering elements thereon, cooperating with the wall of the bore, will also automatically align the end of the optical fiber supported therein with the axis of the bore, and since the ends of both optical fibers are precisely aligned with the bore axis, they will also be precisely aligned with one another.

According to a presently preferred embodiment, the centering elements comprise a plurality of peripheral segments of said cylindrical-shaped housing defined by a plurality of non-diametrical slots extending across the end face of the holder and longitudinally into the holder for a desired distance. The segments so defined are thus integral with the housing at their inner ends and spaced slightly from the remainder of the housing at their outer ends adjacent the end face. When the holder is inserted into the bore of a connector member, the free ends of the segments are capable of being deflected somewhat by the wall of the bore, and, in fact, will automatically deflect to the extent necessary to accurately center the end face of the housing, and, hence, the end of the optical fiber, in the bore.

Further features and specific details of the invention will become apparent hereinafter in conjunction with the detailed description of a presently preferred embodiment thereof.

BRIEF DESCRIPTION OF THE DRAWINGS

FIG. 1 is a cross-sectional view of an optical fiber holder according to a presently preferred embodiment of the invention;

FIG. 2 illustrates the end face of the holder of FIG. 1 looking in the direction of arrow 2 in FIG. 1;

FIG. 3 is an exploded view of an optical fiber connector apparatus according to a presently preferred embodiment of the invention incorporating the optical fiber holder of FIG. 1;

DETAILED DESCRIPTION OF THE PREFERRED EMBODIMENT

Figure 4:
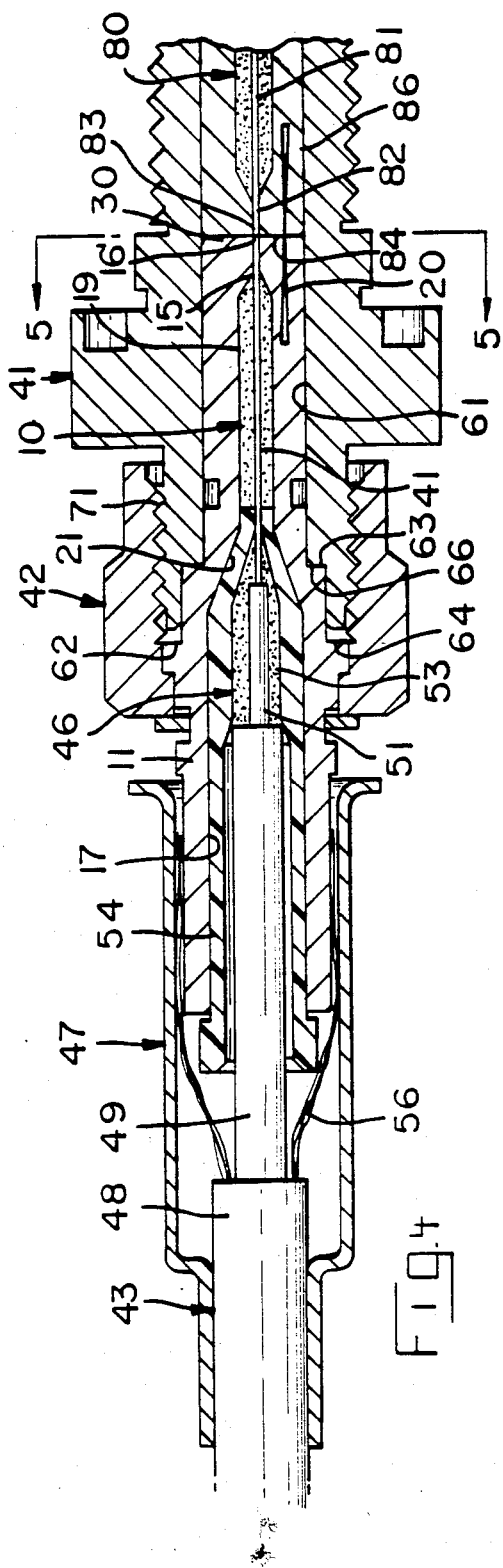
FIG. 4 is a cross-sectional view of the optical fiber connector apparatus of FIG. 3.

FIG. 1 illustrates an optical fiber holder according to a presently preferred embodiment of the invention. The holder is generally designated by reference numeral 10, and comprises a rigid housing 11, preferably of metal, and most preferably machined or otherwise formed from a single piece of bar stock. Housing 11 is advantageously made from a tempered metal that is readily machinable, and one particularly suitable metal is "German silver" containing about 60% copper, about 10–15% nickel, and zinc and lead in varying proportions so as to make the holder readily machinable, yet retain temper. Metals such as "German silver" are commonly used in the watchmaking field and have been found to be especially suitable for use in forming the optical fiber holder of the present invention.

Holder 10 comprises an elongated, generally cylindrical shaped member having a continuous axial bore 12 extending therethrough from first end 13 to opposed second end 14. Bore 12 includes a very small diameter bore section 15 terminating in an opening 16 in the face 30 of first end 13, a relatively large diameter bore section 17, terminating in an opening 18 in the face of second end 14, and an intermediate diameter bore section 19 therebetween. Tapered diameter bore section 20 provides a transition between bore sections 15 and 19, while tapered diameter bore section 21 provides a transition between bore sections 17 and 19.

As will be explained more fully hereinafter, bore 17 is sized to receive a covered optical fiber, while bore 15 is sized to receive and support a fully stripped optical fiber in position to be optically coupled in end-to-end relationship with a second optical fiber mounted within a second holder similar to holder 10.

FIG. 2 illustrates end face 30 of housing 11. Face 30 is substantially circular in shape, and includes opening 16 terminating small diameter bore 15 in the housing. By a method that will be explained hereinafter, opening 16 is positioned substantially exactly in the center of face 30.

Also extending into housing 10 from end face 30 are a plurality of slots 22, 23 and 24. Each slot extends across face 30 in a non-diametrical manner, and in the embodiment illustrated wherein three slots are provided, the slots are formed into a generally triangular shape as clearly shown in FIG. 2.

Slots 22, 23 and 24 extend into housing 11 for a substantial distance (slot 24 is visible in FIG. 1), and define a plurality of resilient housing portions 26, 27 and 28, respectively. More particularly, resilient portions 26, 27 and 28 comprise peripheral segments of housing 11 which are integral with the housing at their inner ends 29, but which are separated from the remainder of housing 11 at their outer ends 31 which are substantially flush with end face 30. As will be explained hereinafter, the free ends 31 of resilient portions 26, 27 and 28 are capable of being deflected slightly toward and away from the axis of holder 10 as shown schematically by arrow 32 in FIG. 1, and function as centering elements for automatically centering the holder in the bore of a connector member within which the holder is adapted to be inserted.

In the embodiment illustrated, housing 11 is from about 9/16 inch to about ⅝ inch in total length and about 1/10 inch in diameter. Each slot 22, 23 and 24 is about 0.005 inch thick and from about ⅛ inch to about 3/32 inch deep. It should be clearly understood, however, that these dimensions could be varied within wide limits depending on the type of material used in forming housing 11, the number and configuration of the resilient portions, and on various other factors.

FIGS. 3 and 4 illustrate an optical fiber connector apparatus according to a presently preferred embodiment of the invention incorporating the optical fiber holder of FIGS. 1 and 2. FIG. 3 is an exploded view of the apparatus, while FIG. 4 illustrates a cross-sectional view of the apparatus.

The overall apparatus is designated by reference numeral 40 and comprises an assembly which generally includes connector member 41, optical fiber holder 10 positioned within connector member 41, fastener 42 for fastening the connector member and holder to one another, optical fiber cable 43 having an optical fiber 44 therein, filler material 46 for retaining the optical fiber and other cable components in position within the holder, and sleeve 47 for attaching the optical fiber cable 43 to holder 10.

Optical fiber cable 43 is comprised of a plurality of different layers of material in order to reliably protect and support the optical fiber 44 substantially axially positioned therein. For example, in the embodiment illustrated in FIGS. 3 and 4, the cable includes an outer cover 48 of strong, flexible plastic or the like, an intermediate layer 49 consisting of a large number of very fine threads, and an inner coating 51 of plastic or the like applied directly to the surface of the optical fiber 44.

It should be understood, however, that optical fiber cables are constructed in many ways with different numbers and types of layers, and it is not intended to restrict the invention to use with any particular optical fiber cable construction.

The end of optical fiber cable 43 is adapted to extend into axial bore 12 of housing 11. Prior to its insertion into bore 12, however, portions of protective layers 48, 49 and 51 are removed from the cable to provide a fully exposed portion of optical fiber 44 extending from and flush with the first end 13 of the housing to approximately the tapered transition portion 21 of the bore; an exposed portion of plastic coated inner layer 51 extending partially into bore portion 17; and an exposed portion of the fine thread layer 49 which extends out the second end 14 of housing 11.

Filler material 46 is positioned within bore 12 of housing 11, surrounds cable 43 therein and generally fills in the space between the cable and the inner wall of bore 12. In the embodiment illustrated, filler 46 comprises a powdered or granular material 53 such as powdered glass, inserted into and held in place within bore 12 by a plug 54 which may also be of glass. Both material 53 and the material forming plug 54 preferably have substantially the same coefficient of expansion as optical fiber 44 so that they won't squeeze or otherwise damage the fiber if the connector apparatus is used within an environment that may be subjected to severe variations in temperature. In the preferred embodiment of the present invention, the preferred powered material 53 is one of a variety of materials and may include, low temperature melting glass from Dow Corning, such as, Dow Corning #696-79-2, 696-71-5 and 696-67-2. Accordingly, during installation of the cable 43, the fiber holder 10 is positioned vertically with the multiple slot end facing downward. The cable 43 is inserted into the holder 10 and the volume between the inner walls of the holder 10 and the cable 43 is filled with the filler 46. The assembly is then brought to a termperature adequate to melt the filler 46, thus completely filling the space between the inner wall of the holder 10 with the assembly thereafter allowed to cool down.

A tubular shaped sleeve 47 of metal or other material is provided to attach housing 11 of optical fiber holder 10 to optical fiber cable 43. As illustrated in FIG. 4, sleeve 47 is sized to surround a portion of both the housing 11 and the outer cover 48 of cable 43, and is preferably firmly attached to both elements by a crimping operation. Preferably also, a portion of fine thread layer 49 of the optical fiber cable 43 is stripped back as shown at 56 and positioned between the outer surface of housing 11 and the inner surface of sleeve 47 prior to crimping the sleeve to more strongly secure the components to one another.

Connector member 41 comprises a cylindrical shaped element provided with an axial bore 61 sized and configured to receive holder 10 therein. More specifically, holder 10 is adapted to be inserted into bore 61 from end 62 of the connector member until shoulder 63 and annular flange 64 on holder 10 impinge against shoulder 66 and end wall 62, respectively, on the connector member, thereby preventing any further movement of the holder into connector member 41.

Once positioned as described above, holder 10 is locked in connector member 41 by fastener 42 which preferably comprises an internally threaded cap adapted to engage the threaded outer surface 71 of connector member 41.

Holder 10 is adapted to be placed in abutting end-to-end relationship with a second holder 80 also supported in connector member 41 as illustrated in FIG. 4. Although not illustrated in the FIGS., means are also provided to fasten holder 80 to the connector member and to fasten and support a second optical fiber cable within holder 80. Holder 80 is preferably identical in construction to holder 10, and supports an optical fiber 81 within its small diameter bore 82 such that the end of the optical fiber 81 will be supported within an opening 83 in the end face 84 of holder 80.

Holders 10 and 80 are adapted to be inserted into bore 61 in connector member 41 from the opposite ends thereof until their respective end faces 30 and 84 are brought into abutting end-to-end relationship as shown in FIG. 4. When inserted into the connector member the resilient portions 26, 27 and 28 of holder 10 and the corresponding resilient portions of holder 80 will contact the wall of bore 61. The resilient portions will function as centering elements and the free end 31 of each portion is capable of being independently deflected by the wall of bore 61 in the directions indicated by arrow 32 (FIG. 1) by amounts to automatically center the end faces 30 and 84 of the holders in the bore 61. Since, as indicated above, openings 16 and 83 in the end faces of holders 10 and 80, respectively, are positioned in substantially the exact center of the end faces, the ends of optical fibers 44 and 81 supported within the openings will also be centered in the bore 61 in alignment with the bore axis, and accordingly, will be automatically aligned with each other.

With the present invention, the combined function of the three resilient portions around the periphery of holders 10 and 80 adjacent the end faces 30 and 84 thereof, will automatically position the ends of the optical fibers supported therein in alignment with the axis of bore 61 and in alignment with one another with minimal center-to-center mismatch (0.5 mils or less) notwithstanding any variations in the diameter of the holders or of the bore 61 within the range of normal manufacturing tolerances. Any variations within this range will simply be compensated for by variations in the extent in which the resilient portions are deflected by the wall of the bore.

Figure 5:
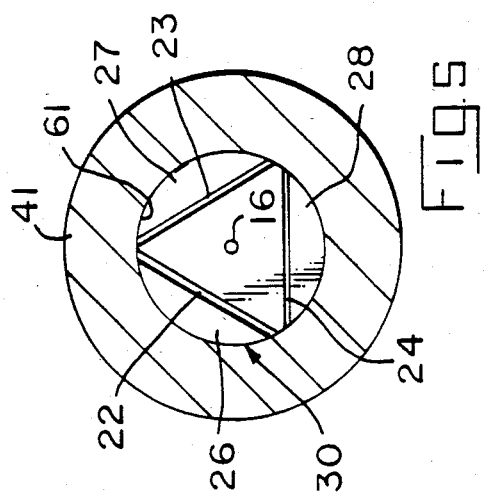
FIG. 5 is a cross-sectional view of the optical fiber connector apparatus of FIG. 4 looking in the direction of arrows 5—5 in FIG. 4.

FIG. 5 is a cross-sectional view of FIG. 4 looking in the direction of arrow 5—5 in FIG. 4. By comparing FIG. 5 to FIG. 2, it can be seen that the free ends 31 of resilient means 26, 27 and 28 have been deflected inwardly somewhat by the wall of bore 61 of connector member 41 to automatically position end hole 16 in the center of the bore.

Thus, with the present invention, accurate alignment of the ends of a pair of optical fibers is achieved automatically by simply inserting a pair of optical fiber holders into a connector member. Additional positioning elements are not needed to align the optical fibers, nor is it necessary to take particular care in manufacturing the holders or the connector member. So long as the components are manufactured within normal manufacturing tolerances, the optical fibers will automatically be aligned in a highly accurate manner.

Figure 6:
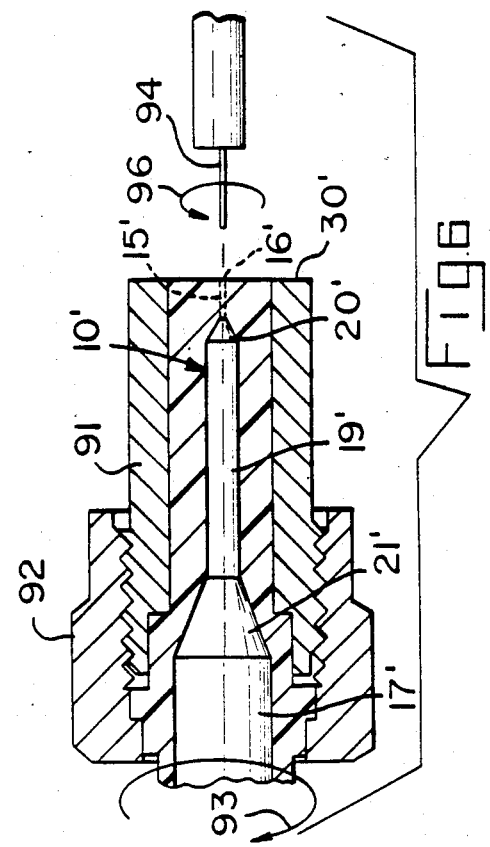
FIG. 6 schematically illustrates a presently preferred method for manufacturing the optical fiber holder of FIGS. 1 and 2.

FIG. 6 illustrates a method of positioning the opening 16 (or 83) in the exact center of the end face 30 (or 84) of the holder according to a presently preferred embodiment of the invention.

Initially, the holder 10' is manufactured with bore portions 17', 21', 19' and 20' machined in the member, but without small diameter bore portion 15' (shown in dotted line) having been formed therein. The partially completed member is then positioned within a sleeve 91 which is stationary and having a bore which has been manufactured at substantially the center of the tolerance range of the connector member into which the holder will later be inserted. Sleeve 91 is then used as a positioning means for drilling bore 15' into the end 30' of member 10' of the diameter appropriate to the fiber to be supported, for example, 125 microns.

More specifically, holder 10' is rotated around its axis in a first direction 93 while drill 94 is rotated in the opposite direction 96 to drill small bore 15' and form opening 16' in end face 30'. The rotation of the holder 10' carried thereby during the drilling of bore 15' automatically ensures that bore 15' extends into holder 10' from substantially the exact center of end face 30' and that opening 16' is positioned substantially in the exact center of the end face. The rotation of member 10' during the drilling operation cancels out any eccentricity that exists between the drill and the end face 30' of member 10'. If any eccentricity is present, this will increase the diameter of bore 15', but it will always be positioned in the exact center of end face 30'. The sleeve 91 and the holder 10' are thereafter locked together by a suitable fastener 92.

Thus, with the above-described method, it can be assured that the opening 16 will always be substantially in the exact center of the end face 30 of the holder so that when the holder is inserted into a connector member, the opening, and the end of the optical fiber supported therein will automatically be aligned with the axis of the bore of the connector member.

While what has been described constitutes a presently preferred embodiment of the invention, it should be understood that the invention could take many other forms. For example, the centering elements can be formed in different ways on the holder. Also, the number of centering elements and their configuration can be varied in many ways. In addition, the orientation of the slots defining the centering element can be varied. Since those skilled in the art are likely to devise numerous variations and modifications which do not depart from the true scope of the invention, all such variations and modifications are intended to be covered by the appended claims.

We claim:

1. An optical fiber holder comprising a housing, means for defining an opening in one end of said housing for receiving and for holding an end of an optical fiber, and a surrounding portion of said housing surrounding said opening, the improvement comprising,
a plurality of centering elements integral with said housing and distributed around the periphery of said surrounding portion of said housing and constructed for deflection resiliently toward said surrounding portion of said housing.

2. An optical fiber holder as recited in claim 1, wherein the improvement further comprises, said centering elements have respective free ends distributed around the periphery of said surrounding portion of said housing.

3. An optical fiber holder as recited in claim 2, wherein the improvement further comprises, said free ends of said centering elements are defined by slots extending axially along said housing.

4. An optical fiber holder as recited in claim 3, wherein the improvement further comprises, an end of said housing, said slots and said opening communicate with said end of said housing.

5. An optical fiber holder as recited in claim 4, wherein the improvement further comprises, said free ends of said centering elements and said surrounding portion of said housing extending to said end of said housing.

6. An optical fiber holder as recited in claim 1, wherein the improvement further comprises, an end of said housing, said centering elements and said surrounding portion of said housing extending to said end of said housing.

7. An optical fiber holder as recited in claim 6, wherein the improvement further comprises, free ends of said centering elements extending to said end of said housing.

8. An optical ffiber holder as recited in claim 7, wherein the improvement further comprises, slots extending axially of said housing and extending between said free ends of said centering elements and said surrounding portion of said housing.

9. An optical fiber holder as recited in claim 8, wherein the improvement further comprises, said surrounding portion of said housing is substantially rigid.

10. An optical fiber holder as recited in claim 1, wherein the improvement further comprises, said surrounding portion of said housing is substantially rigid.

11. A method of manufacturing optical fiber holders, comprising:
providing an elongated housing;
rotating said housing around its axis while simultaneously drilling an opening in one end of said housing, the rotation of said housing forming said opening in substantially the exact center of said one end; and
positioning the end of an optical fiber in said opening.

12. The method of claim 11 wherein said drilling step comprises rotating said drill in the opposite direction from the direction of rotation of said housing.

13. The method of claim 11 wherein said rotating step comprises positioning said housing in a sleeve manufactured at substantially the center of the tolerance range of a connector member into which said housing will later be inserted, and rotating said sleeve and said housing positioned therein.

14. The method of claim 13 and further including the step of forming a portion of an axial bore in said housing extending from a second end thereof to adjacent said one end, and wherein said drilling step comprises drilling the remainder of said bore from said one end to said portion of said axial bore.

* * * * *